G. H. PETRI.
FORMING MACHINE.
APPLICATION FILED NOV. 5, 1909.

957,247.

Patented May 10, 1910.

WITNESSES
H. M. Walsh.
A. B. Lindsay.

INVENTOR
GUNTHER H. PETRI
BY HIS ATTORNEYS
Mitchell, Chadwick & Kent

UNITED STATES PATENT OFFICE.

GUNTHER H. PETRI, OF BOSTON, MASSACHUSETTS.

FORMING-MACHINE.

957,247.  Specification of Letters Patent.  Patented May 10, 1910.

Application filed November 5, 1909. Serial No. 526,373.

*To all whom it may concern:*

Be it known that I, GUNTHER H. PETRI, a citizen of the United States, residing at Boston, in the county of Suffolk and State of Massachusetts, have invented new and useful Improvements in Forming-Machines, of which the following is a specification.

This invention relates to forming machines.

More particularly it relates to improvements in machinery for forming dough and other plastic materials into balls.

The object of the invention is to provide an improved type of such machinery, simple and effective in operation and of large capacity in proportion to its size.

An embodiment of the invention is illustrated in the accompanying drawings in which—

Figures 1, 2:
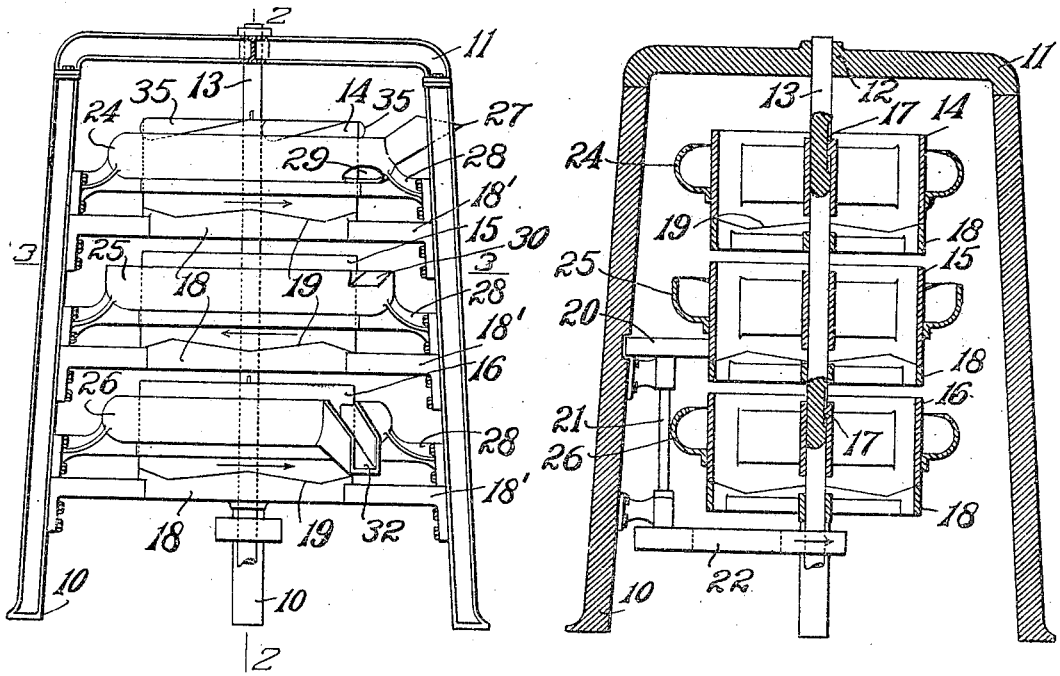
Figure 3:
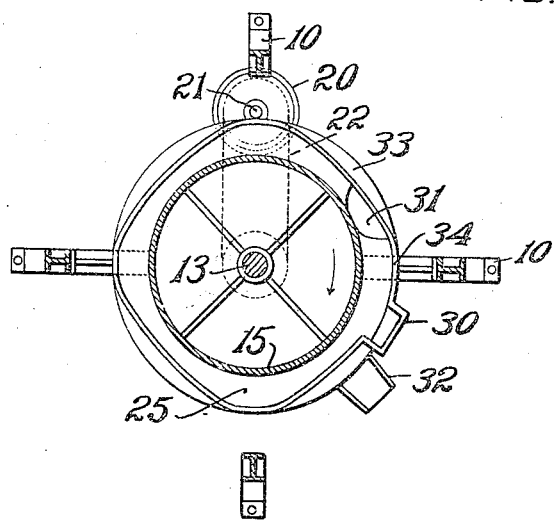

Figure 1 is a side elevation; Fig. 2 is a front elevation in section on the line 2—2 of Fig. 1; and Fig. 3 is a plan in section on the line 3—3 of Fig. 1.

Referring to the drawings, a standard comprising four legs 10—10 is seen, having uprights, which stand around the mechanism hereinafter described, and cross pieces 11 joining them over the machine, uniting at the center in a journal 12 for a vertical shaft 13, which passes through the axes of three drums, arranged one over the other, marked respectively 14, 15 and 16, and each rotating in a direction different from its neighbor. The top and bottom drums 14 and 16 are splined to the shaft as seen clearly in Fig. 2 at 17. They rotate with the shaft, and are movable up and down in the axial direction. The drum 15 is loose on shaft 13. Under each drum is a support 18, whose upper surface is a cam represented by the line 19 in Fig. 2 having a number of high points with intervening low points. As here represented, there are four such elevations and depressions. These cams are supported on brackets 18', seen in Fig. 1. The central drum 15 is driven in the opposite direction of rotation from the drums on either side of it by a wheel 20 which makes frictional contact with the surface of the drum, this wheel being mounted on a shaft 21 which is driven by belt 22 from the main driving shaft 13, to which power may be supplied from any suitable source.

Surrounding each of the drums, in a plane perpendicular to the axes thereof, is a trough. These troughs are marked respectively 24, 25, 26, corresponding to the drums 14, 15 and 16. They are stationary and are supported by brackets 28, seen in Fig. 1. Troughs of different shapes may be used according to the needs of the work in hand. A chute 27 is provided in the top trough 24 for feeding material into the trough. The bottom of this trough 24 has an opening 29, under which is another chute 30 leading into the trough 25. In trough 25 is a discharge opening 31, seen in Fig. 3, and under that may be a similar chute leading into trough 26. A discharge chute 32 leads from trough 26. It will be observed that when a mass of dough is placed in one of these troughs, it touches the bottom and outer side of the trough and the adjacent drum. If desired, these troughs may be covered in whole or in part. The drawings represent them with an irregular top which extends from the semi-covered shape, seen at 33 in Fig. 3, to the entirely uncovered shape, seen at 34 in the same figure. The top drum 14 carries projections 35 which protrude over the trough 24 to a certain degree and these preferably, instead of being continuous, are separated by spaces and have bottom surfaces like cams as seen clearly in Fig. 1.

In operation when power is applied to shaft 13 the drums 14 and 16 rotate in the direction shown by the arrows thereon (Fig. 1) and the drum 15 rotates in the opposite direction. When a mass of dough enters trough 24 through chute 27, it is immediately engaged between the stationary wall of the trough and the moving side of the drum. The latter has both a rotatory motion, moving horizontally past the dough, and a vertical motion caused by cam 19. The result is that the dough is subjected to a rolling force, which tends continuously to roll it around through trough 24 and at the same time rolls it alternately up and down therein. If the upward rolling of the mass happens to occur under one of the uncovered spaces 34, the motion is simple as described; but, if the upward motion happens to occur under one of the covered spaces 33 the mass cannot follow the drum upward to the full extent and is compressed and kneaded to a degree under the cover 33. If the mass does not respond readily to descend when the roll descends, the projections 35 will drive it down, the sloping under cam-surface of these projections engaging the mass gradually and effectively for this purpose.

When the mass has passed through this rolling and kneading action until it has nearly completed the circuit of the trough 24, it reaches the opening 29 in the bottom of that trough, which is located close to the entrance chute 27, and falls out of the trough and into the entrance chute 30 of the trough 25. In trough 25 the mass undergoes similar action, but the rotation is in the opposite direction and, having completed the circuit, the mass drops through discharge opening 31 into trough 26, in which its direction or rotatory kneading is again reversed, and the mass is carried around until it is discharged from the machine at 32.

While the drawing shows an embodiment of the invention, it is to be understood that the same principles may be applied in different form and in other embodiments of the same ideas so that the patent is not limited to the specific form of invention here illustrated and described. In particular, for example, the troughs and drums might be transposed, the troughs being rotating members inside of stationary drums, the dough in that case working against the concave interior of drum cylinders, and other variations might be made.

I claim:

1. A forming machine comprising the combination of a cylinder, a trough arranged in a plane perpendicular to the axis of the cylinder, one of these parts encircling the other; means to produce relative rotation between them whereby a mass there between will be rolled; another such cylinder and trough adjacent, the rotation being opposite; and means for transferring the mass from one trough to the other.

2. A forming machine comprising the combination of a cylinder, a trough arranged in a plane perpendicular to the axis of the cylinder, one of these parts encircling the other; means to produce relative rotation between them whereby a mass there between will be rolled; another such cylinder and trough adjacent, the rotation being opposite; and means for transferring the mass from one trough to the other; said cylinders and troughs being all on one vertical axis.

3. A forming machine comprising the combination of a cylinder, a trough arranged in a plane perpendicular to the axis of the cylinder, one of these parts encircling the other; means to produce relative rotation between them whereby a mass there between will be rolled; another such cylinder and trough adjacent, the rotation being opposite; said cylinders and troughs being all on one vertical axis; there being a hole through the upper trough permitting a mass to fall thence into the lower trough.

4. A forming machine comprising the combination of a rotating cylinder and a stationary trough arranged in a plane perpendicular to the axis of the cylinder, one of these parts encircling the other; another such cylinder and trough adjacent, the cylinder rotating in the opposite direction; and means for transferring a mass of material from one trough to the other.

5. A forming machine comprising the combination of a rotating cylinder and a stationary trough arranged in a plane perpendicular to the axis of the cylinder, one of these parts encircling the other; another such cylinder and trough adjacent, all being on one vertical axis; and the second rotating in opposite direction; there being in the upper trough a place for entrance of material and an opening in the bottom of the trough adjacent thereto for discharge of material which has completed the circuit; and there being in the lower trough an entrance opening under said discharge opening.

6. A forming machine comprising the combination of a cylinder, a trough arranged in a plane perpendicular to the axis of the cylinder, one of these parts encircling the other; means to produce relative rotation between them whereby a mass there between will be rolled; another such cylinder and trough adjacent, the rotation being opposite; and means for transferring the mass from one trough to the other; said cylinders and troughs being all on one vertical axis; there being a shaft at the axis with which one of the rotating parts is engaged and peripheral driving means by which the other rotating part is actuated in the opposite direction of rotation.

7. A forming machine comprising the combination of a cylinder, a trough arranged in a plane perpendicular to the axis of the cylinder, one of these parts encircling the other; means to produce relative rotation between them whereby a mass there between will be rolled; another such cylinder and trough adjacent, the rotation being opposite; and means for transferring the mass from one trough to the other; there being also means to produce in the axial direction a reciprocating motion of a cylinder with respect to its trough coincidentally with said rotation.

8. A forming machine comprising the combination of a cylinder, a trough arranged in a plane perpendicular to the axis of the cylinder, one of these parts encircling the other; means to produce relative rotation between them whereby a mass there between will be rolled; another such cylinder and trough adjacent, the rotation being opposite; and means for transferring the mass from one trough to the other; there being also means to produce in the axial direction a reciprocating motion of a cylinder with respect to its trough coincidentally with said rotation; one of said troughs having a bottom portion in one direction of the axis and a partly covered portion in the other direction of the axis against which the mass may be compressed by said reciprocating motion.

9. A forming machine comprising the combination of a cylinder, a trough arranged in a plane perpendicular to the axis of the cylinder, one of these parts encircling the other; means to produce relative rotation between them whereby a mass there between will be rolled; another such cylinder and trough adjacent, the rotation being opposite; and means for transferring the mass from one trough to the other; there being also means to produce in the axial direction a reciprocating motion of a cylinder with respect to its trough coincidentally with said rotation; one of said troughs having a closed portion in one direction of the axis and being partly open in the other direction of the axis and the cylinder having cam-faced projections rotating in said partly open space and adapted to engage and drive backward a mass therein.

10. A forming machine comprising the combination of a vertical shaft, two cylinders rotated thereby, another cylinder loose thereon and peripheral driving means rotating it in the opposite direction, a trough for each cylinder encircling it in a plane perpendicular to the axis, and a succession of openings and entrances thereunder in adjacent troughs for transferring masses from one to the other.

11. A forming machine comprising the combination of a vertical shaft, a cylinder splined thereon, a member supporting the cylinder, there being a cam surface between it and the cylinder whereby the cylinder receives axial motion as it rotates, a trough surrounding the cylinder, an adjacent cylinder and trough and means for relative rotation between them in the opposite direction; and means for transferring a mass from one trough to the other.

12. A forming machine comprising the combination of a cylinder, a trough, one of these being arranged around the other and there being means to produce relative rotation between them in that position, whereby a mass between them will be rolled; another such cylinder and trough adjacent with rotation rolling such a mass in the opposite direction; and means to transfer the mass from one to the other.

13. A forming machine comprising the combination of a cylinder, a trough, one of these being arranged around the other and there being means to produce relative rotation between them in that position, whereby a mass between them will be rolled; another such cylinder and trough adjacent with rotation rolling such a mass in the opposite direction; the said rotating parts being upon one vertical axis and there being means for transferring the mass from one trough to the other in which the path of the mass while being transferred leads through a space between the troughs wherein it is free from engagement with all the rotating parts.

14. A forming machine comprising the combination of a vertical shaft, a plurality of cylinders arranged upon the axis thereof and means to rotate adjacent cylinders in opposite directions, a trough adjacent to each cylinder, wherein a mass may be rolled by rotation of the cylinder; and a passage for the mass from trough to trough.

15. A forming machine comprising the combination of a cylinder, a trough, one of these being arranged around the other and there being means to produce relative rotation between them in that position, whereby a mass between them will be rolled; means to produce a reciprocating motion of one with respect to the other in the direction of the axis coincidentally with said rotation; the trough having a closed portion in one direction of the axis and a partly closed portion in the other direction of the axis against which the mass may be intermittently compressed by said reciprocating motion while being rolled around the cylinder.

Signed by me at Boston, Mass., this third day of November, 1909.

GUNTHER H. PETRI.

Witnesses:
EVERETT E. KENT,
JOSEPH T. BRENNAN.